Patented Feb. 21, 1950

2,498,010

UNITED STATES PATENT OFFICE 2,498,010

PROCESS FOR THE PRODUCTION OF CELLULOSE ESTERS

George W. Seymour, Millburn, Blanche B. White, Summit, and Mark Plunguian, Gillette, N. J., assignors to Celanese Corporation of America, a corporation of Delaware No Drawing. Application August 28, 1947, Serial No. 771,148

5 Claims. (Cl. 260—227)

This invention relates to the production of organic acid esters of cellulose and relates more particularly to an improved process for the production of such cellulose esters.

An object of this invention is the provision of an improved process for the production of organic acid esters of cellulose wherein the esterification reaction may be completed in a relatively short time.

Another object of this invention is to provide an improved process for the esterification of cellulose wherein not only is the esterification reaction effected in a rapid and efficient manner but the viscosity characteristics of the cellulose esters obtained are closely controlled as well.

Other objects of this invention will appear from the following detailed description.

In the preparation of organic acid esters of cellulose, such as cellulose acetate, for example, the cellulose undergoing esterification, which may have been subjected to a suitable pretreatment to render it more reactive, is esterified by treatment with an esterification medium comprising acetic anhydride, a catalyst such as sulfuric acid, and glacial acetic acid which acts as a solvent for the cellulose acetate formed. Usually, the esterification medium is cooled initially to a relatively low temperature so that the heat generated by the exothermic esterification reaction will not cause the reaction mixture to rise to an excessively high temperature. In addition, external cooling is frequently applied with the object of further controlling the reaction temperature. Where, for example, the reaction temperature is allowed to rise very rapidly to a temperature of say, 60° C., or more, with little control, the cellulose undergoes considerable degradation during the resulting esterification reaction and the cellulose acetate obtained is of excessively low viscosity and unsuitable for the production of films or filaments.

Normally, the heat generated during the acetylation reaction is permitted to cause a gradual and controlled increase in reaction temperature until a peak temperature of about 35 to 50° C. is reached. At this stage of the acetylation reaction, a part of the cellulose present is still not completely esterified. Accordingly, the reaction is allowed to continue for an additional period, usually for from 2 to 5 hours more, until all of the unacetylated cellulose fibers are completely acetylated and in solution. The necessity for prolonging the reaction for this extended period to ensure complete acetylation renders the same rather slow and time-consuming, and precludes the effecting of the acetylation reaction in a continuous manner in a commercially practical period of time.

We have now found that organic acid esters of cellulose of very desirable characteristics may be prepared in but a fraction of the time previously found necessary if the temperature of the esterification reaction is so controlled as to permit it to rise very rapidly to between about 20 to 25 and 40° C. When the temperature of the reaction mixture has reached the desired point, and the reaction has proceeded for the desired period of time, the temperature of the reaction mixture is then raised by external heat, if necessary, to complete the esterification of the cellulose fibers which have not been esterified in the initial stage. We have found that the major portion of the cellulose may be esterified during the initial stage of the reaction when the temperature of the reaction mixture is permitted to rise rapidly and is then maintained at the temperature to which it has been allowed to rise, e. g. between 20 to 25 and 40° C., for from 5 to 40 minutes. By then raising the reaction temperature above the maximum temperature maintained during the initial stage of the reaction, in accordance with our novel process, the esterification of the relatively small proportion of unesterified cellulose fibers which still remain may be effected very quickly and in a far shorter time than where the temperature is not raised. As a result, the total time required to carry out the esterification reaction is considerably less than that normally required without in any way impairing the properties of the cellulose esters produced. Surprisingly enough, increasing the reaction temperature after the major portion of the cellulose has been esterified during the first stage of the reaction has little or no tendency to degrade the cellulosic materials present in the reaction medium and to cause an undesirable decrease in the viscosity of the cellulose ester finally obtained.

The viscosity of the cellulose esters produced by our novel process may be varied, however, since we have found that said viscosity is determined by the temperature to which the reaction mixture is permitted to rise during the initial or first stage of the reaction esterification. The lower the reaction temperature during the first stage of the reaction wherein the major proportion of the cellulose is esterified, the higher will be the final viscosity of the cellulose ester obtained.

Thus, for example, when acetylating cellulose in an esterification medium cooled below atmospheric temperature comprising acetic anhydride, sulfuric acid and glacial acetic acid, in accordance with our novel process, in order to produce cellulose acetate of higher viscosity, the temperature of the first stage of the acetylation reaction may be allowed to reach a maximum of about 25° C. and this temperature may be maintained for from about 5 to 40 minutes until the acetylation reaction is substantially completed, prior to raising the temperature to from about 40 to about 60° C. for about 5 to 40 minutes in order that the unesterified fibers remaining be completely acetylated. Where a cellulose acetate of a somewhat lower viscosity is desired, the temperature during the initial or first stage of the acetylation may be permitted to rise to about 30° C. However, at this higher reaction temperature, the acetylation of the major portion of the cellulose present takes place in a relatively shorter time. Thus, after the reaction has proceeded for about 5 to 20 minutes, and preferably for about 8 to 10 minutes, at about 30° C., the temperature may then be raised to 40 to 60° C. in order to complete the acetylation of the unesterified fibers. Still lower viscosities may be obtained, if desired, in accordance with our novel process, if the initial reaction temperature is allowed to rise to about 35 to 40° C. Under these reaction conditions, the major part of the acetylation reaction is completed in from about 2 to about 10 minutes, say, in about 5 minutes, and the reaction mixture may then be raised to a temperature of about 50 to about 60° C. and maintained at this temperature of from about 5 to about 15 minutes to complete the acetylation of the fibers which still remain unesterified after the first stage of the reaction has been completed.

After the acetylation reaction has been completed and substantially no unacetylated fibers remain, the primary cellulose acetate obtained may then be ripened or hydrolyzed while in solution to a secondary cellulose acetate of the desired solubility characteristics. The hydrolysis or ripening may be effected in the manner well known in the art, after any unreacted acetic anhydride has been neutralized and water for ripening has been added, with or without the neutralization of all or part of the free sulfuric acid esterification catalyst remaining on completion of esterification.

In order further to illustrate our invention but without being limited thereto, the following examples are given:

*Example I*

150 parts by weight of cellulose are pretreated at 25° C. for 60 minutes with a mixture of 0.75 part by weight of sulfuric acid, 0.75 part by weight of water an 52.5 parts by weight of glacial acetic acid. The pretreated cellulose is then added to an acetylizer provided with a suitable agitator and cooling jacket containing 370 parts by weight of acetic anhydride, 490 parts by weight of glacial acetic acid and 20 parts by weight of sulfuric acid, cooled to a temperature of 5° C. The heat generated by the exothermic acetylation reaction which takes place after the pretreated cellulose has been added to the acetylation medium raises the temperature of the reaction mixture. The temperature rise is controlled by circulating a cooling medium through the acetylizer jacket so that the reaction temperature does not go above 25° C. The temperature is maintained at 25° C. for 40 minutes. Heat is then supplied to the jacket to raise the temperature of the medium. The temperature of the reaction mixture gradually increases to 42° C. and is maintained at this temperature until the charge clears and the reaction is complete after a total reaction time of 69 minutes. After sufficient water for ripening has been added and about 66% of the sulfuric acid present has been neutralized, the primary cellulose acetate in solution is then ripened to an acetone-soluble secondary acetate of an acetyl value of 56.0%, calculated as acetic acid. The viscosity of the ripened cellulose acetate obtained in a 6% by weight solution in a solvent comprising 95% by weight of acetone and 5% by weight of water is 695 centipoises.

*Example II*

Cellulose is pretreated and esterification started as described in Example I. During the first part of the acetylation, the temperature of the reaction mixture is brought up to 25° C. in 12 minutes and is maintained at this temperature for another 20 minutes. The temperature of the reaction mixture is then increased to 43° C. in 15 minutes and is maintained at this temperature for another 10 minutes. At the end of this time the reaction is completed, the charge being clear, or free of unacetylated fibers. After ripening as before to an acetyl value of 51.8%, the cellulose acetate is precipitated from solution. The viscosity of the ripened cellulose acetate obtained in a 6% by weight solution in a solvent comprising 95% by weight of acetone and 5% by weight of water is 515 centipoises.

*Example III*

Cellulose is pretreated and esterification started as described in Example I. During the first part of the acetylation, the temperature is allowed to rise gradually to 29° C. in 10 minutes. The temperature of the heating medium in the jacket is then raised to 45° C. The temperature of the reaction mixture is thereby increased to 49° C. in 5 minutes and then gradually decreases to 44° C. and clears in another 9 minutes. The total esterification time is 24 minutes. After ripening to an acetyl value of 56.3%, calculated as acetic acid, with 66% of the sulfuric acid neutralized, the ripened secondary cellulose acetate is precipitated from solution. The viscosity of the ripened cellulose acetate obtained in a 6% by weight solution in a solvent comprising 95% by weight of acetone and 5% by weight of water is found to be 320 centipoises.

*Example IV*

Cellulose is pretreated and esterified in the manner described in Example I, but the acetylation mixture is cooled but to 13° C. prior to the addition of the cellulose and the start of the reaction. The temperature of the reaction mixture is allowed to rise to 39° C. in 5 minutes. The water in the jacket is then heated to a temperature of 45° C. The temperature of the reaction mixture rises to a peak of 57° C. in another four minutes. In the next 4 minutes, the temperature is decreased to 49° C. and the charge is found to be clear of unacetylated fibers. The acetylation reaction is thus complete after a total reaction time of 13 minutes. The excess acetic anhydride is destroyed by the addition of water to the primary solution, an additional amount of water is added for ripening and, after neutralizing 66% of the sulfuric acid catalyst remaining, the primary cellulose acetate in solution is ripened to a secondary acetate of an acetyl value of 55.8%, calculated as acetic acid. The ripened cellulose acetate may then be precipitated from solution. The viscosity of the cellulose acetate in a 6% by weight solution in a solvent comprising 95% by weight of acetone and 5% by weight of water is 184 centipoises.

While the novel process of our invention has been described more particularly in connection with the preparation of cellulose acetate, other organic acid esters of cellulose may also be prepared in accordance with said process. Examples of other organic acid esters of cellulose which may be prepared by our process are cellulose propionate and cellulose butyrate as well as mixed esters such as cellulose acetate-propionate and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of organic acid ester of cellulose wherein cellulose is esterified with a lower aliphatic acid anhydride employing an acid esterification catalyst, the steps which comprise cooling the reaction mixture below atmospheric temperature and effecting the esterification reaction in a plurality of reaction stages, the first stage being carried out with the esterification reaction temperature being maintained at about 20 to 40° C. from about 5 to 40 minutes until the major portion of the cellulose is esterified, then raising the reaction temperature to about 25 to 60° C. and continuing the esterification reaction at the higher temperature for from 5 to 40 minutes whereby the esterification of the cellulose is completed.

2. In a process for the production of cellulose acetate wherein cellulose is esterified with acetic anhydride employing an acid esterification catalyst, the steps which comprise cooling the reaction mixture below atmospheric temperature and effecting the esterification reaction in a plurality of reaction stages, the first stage being carried out with the esterification reaction temperature being maintained at about 20 to 40° from about 5 to 40 minutes until the major portion of the cellulose is acetylated, then raising the reaction temperature to about 25 to 60° C. and continuing the acetylation reaction at the higher temperature for from 5 to 40 minutes whereby the acetylation of the cellulose is completed.

3. In a process for the production of cellulose acetate wherein cellulose is esterified with acetic anhydride employing an acid esterification catalyst, the steps which comprise cooling the reaction mixture below atmospheric temperature and effecting the esterification reaction in a plurality of reaction stages, the first stage being carried out with the esterification temperature being maintained at about 25° C. for 5 to 40 minutes until the major portion of the cellulose is acetylated, then raising the reaction temperature to from about 40 to about 60° C. and maintaining said higher temperature for from about 5 to 40 minutes whereupon the acetylation reaction is completed.

4. In a process for the production of cellulose acetate wherein cellulose is esterfied with acetic anhydride employing an acid esterification catalyst, the steps which comprise cooling the reaction mixture below atmospheric temperature and effecting the esterification reaction in a plurality of reaction stages, the first stage being carried out with the esterification temperature being maintained at about 30° C. for 5 to 20 minutes until the major portion of the cellulose is acetylated, then raising the reaction temperature to from about 40 to about 60° C. and maintaining said higher temperature for from about 5 to 40 minutes whereupon the acetylation reaction is complete.

5. In a process for the production of cellulose acetate wherein cellulose is esterified with acetic anhydride and an acid esterification catalyst, the steps which comprise cooling the reaction mixture below atmospheric temperature and effecting the esterification reaction in a plurality of reaction stages, the first stage being carried out with the esterification temperature being maintained at about 35 to 40° C. for 2 to 10 minutes until the major portion of the cellulose is acetylated, then raising the reaction temperature to from about 45 to about 60° C. and maintaining said higher temperature for from about 5 to 40 minutes whereupon the acetylation reaction is complete.

GEORGE W. SEYMOUR.
BLANCHE B. WHITE.
MARK PLUNGUIAN.

REFERENCES CITED

The following references are of record in the file of this patent:

UNITED STATES PATENTS

| Number | Name | Date |
|---|---|---|
| 2,317,767 | Hoffman et al. | Apr. 27, 1923 |
| 2,036,947 | McKee et al. | Apr. 7, 1936 |
| 2,110,642 | Auden et al. | Mar. 8, 1938 |